(12) United States Patent
Dorenbosch

(10) Patent No.: US 6,208,668 B1
(45) Date of Patent: Mar. 27, 2001

(54) APPARATUS AND METHOD FOR ACQUIRING AN OPERATING CHANNEL

(75) Inventor: Jheroen Pieter Dorenbosch, Paradise, TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 08/979,143

(22) Filed: Nov. 26, 1997

(51) Int. Cl.$^7$ ................................ H04J 3/06; H04Q 7/00
(52) U.S. Cl. ............................................ 370/509; 370/311
(58) Field of Search .................................... 370/509, 503, 370/507, 508, 510, 311, 321, 357, 506, 512, 513, 310, 329; 455/343; 340/825.44

(56) References Cited

U.S. PATENT DOCUMENTS

| | | | |
|---|---|---|---|
| 4,804,954 | * 2/1989 | Macnak et al. | 370/825.44 |
| 5,910,944 | * 6/1999 | Callicotte et al. | 370/311 |
| 5,940,431 | * 8/1999 | Haarsten et al. | 375/202 |
| 6,009,319 | * 12/1999 | Khullar et al. | 455/343 |
| 6,016,312 | * 1/2000 | Storm et al. | 370/311 |
| 6,023,477 | * 2/2000 | Dent | 370/509 |
| 6,029,061 | * 2/2000 | Kohlschmidt | 455/343 |

* cited by examiner

*Primary Examiner*—Douglas Olms
*Assistant Examiner*—Brian Nguyen
(74) *Attorney, Agent, or Firm*—R.. Louis Breeden

(57) ABSTRACT

A method and selective messaging unit arranged for acquiring an operating channel (123), that is divided into frames including a signal frame. The selective messaging unit after losing the operating channel provides a clock accuracy (421) based upon an elapsed time counter (243) and a known accuracy or stability of a clock (241). The clock accuracy is compared to a thresholds and the results of this comparison (s) is used to control the frequency and location of scanning in search of an operating channel.

12 Claims, 4 Drawing Sheets

APPARATUS AND METHOD FOR ACQUIRING AN OPERATING CHANNEL

FIELD OF THE INVENTION

This invention relates generally to communication systems and more specifically but not limited to methods and corresponding apparatus for acquiring an operating channel.

BACKGROUND OF THE INVENTION

Communications systems, and specifically messaging and paging systems, typically communicate on a channel using signals having a specified radio frequency. In normal operation messaging systems utilize a scheduled channel protocol where the system and a selective messaging unit by virtue of operating on the system know a predetermined time where communication is possible. This scheduled channel protocol facilitates battery savings since the unit or most of the circuitry in the unit is inactive or asleep most of the time. These systems operate as long as the channel or signal can be reliably received by selective messaging units operating within the system. Where the signal strength of the channel received by the selective messaging unit falls below a sensitivity level, the selective messaging unit will lose that channel.

Subsequently, the selective messaging unit will typically attempt an energy search to identify one or more channels with an appropriate signal. This energy search will ordinarily include the original channel lost, or may include other additional channels. Energy searches require the receive circuitry of the selective messaging unit to be active and tuned to the proper frequency. While active, this circuitry tends to require large amounts of energy or power relative to that required in an inactive state, and this power must be supplied from a very limited energy source such as a battery.

After the operating channel is lost, the selective messaging unit must rely on an internal clock and its accuracy for a time reference that will usually vary from the system time reference. Thus the selective messaging unit must do an energy search relatively often to acquire or re-acquire an operating channel in a reasonable period of time. Though design trade-offs can be made between the frequency of searches and the time required to obtain a viable operating channel versus the limited energy source, user expectations normally mitigate in favor of finding a channel rapidly and battery life ends up suffering.

Clearly a need exists to more effectively allow a selective messaging unit to acquire an operating channel while minimizing battery usage.

BRIEF DESCRIPTION OF THE DRAWINGS

The features of the present invention that are believed to be novel are set forth with particularity in the appended claims. However, the invention together with further advantages thereof, may best be understood by reference to the accompanying drawings wherein:

DETAILED DESCRIPTION OF A PREFERRED EMBODIMENT

The present disclosure concerns communications systems, such as selective messaging systems. The selective messaging units operating within these selective messaging systems are arranged to provide efficient paging or messaging capability that effectively utilizes the limited power resources of these selective messaging units. A preferred method embodiment, set in a selective messaging unit (SMU), is a method of acquiring an operating channel that minimizes battery usage. The selective messaging unit will have a clock and operate on one or more operating channels. Each operating channel is temporally divided into cycles and each cycle is further divided into frames. One of these frames has a signal lasting for a full frame time, and this frame will periodically repeat, preferably a minimum of four times per cycle. The method of acquiring an operating channel after that operating channel has been lost includes: providing a clock accuracy corresponding to the clock; comparing the clock accuracy to a first threshold; and scanning for the signal within the frame time based on a time reference determined by the clock of the selective messaging unit and, responsive to the step of comparing, scanning for the signal during an adjacent frame based on the clock.

The step of providing preferably includes determining an elapsed time since the operating channel has been lost. Once this determination has been made the clock accuracy is formed in accordance with the elapsed time and an oscillator stability. Preferably, the process of comparing includes comparing the clock accuracy to a first time delta corresponding to a nearest frame boundary of the frame. Further included is comparing the clock accuracy to a second threshold that is a second time delta corresponding to another frame boundary of the frame. As the clock accuracy further degrades, the method compares the clock accuracy to an increasing integer multiple of signal frame time and the first time delta or second time delta. Subsequent to these comparisons, the step of scanning in the method includes, responsive to the step of comparing or results of that step, scanning for the signal during one or more higher order adjacent frames based on the clock.

A preferred apparatus embodiment of the instant invention in a selective messaging unit arranged and constructed to implement the aforementioned methodology is further explained below.

Figure 1:
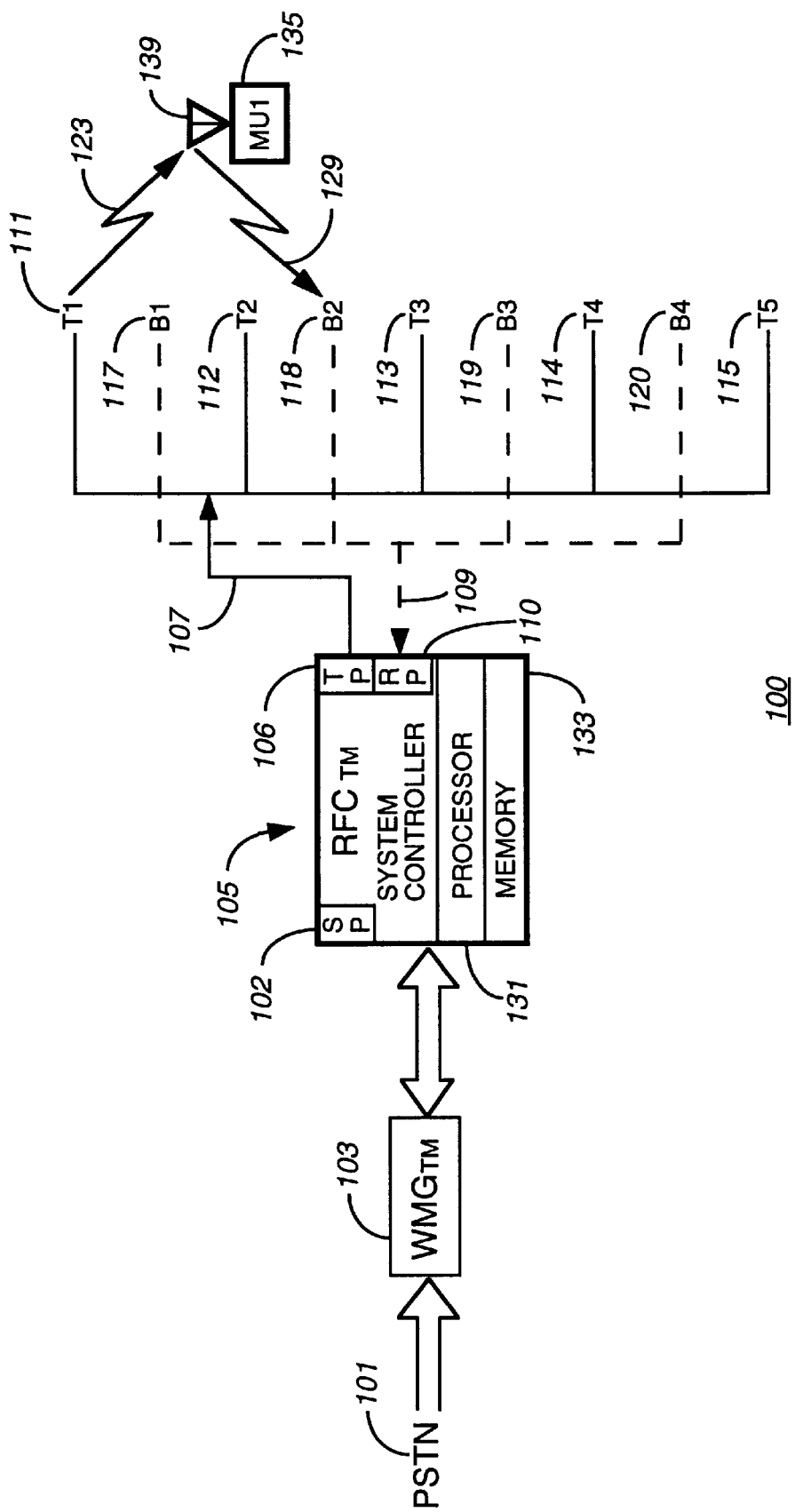
FIG. 1 is a block diagram of a selective messaging system suitable for employing an embodiment in accordance with the instant invention.

For a clearer understanding of the present disclosure the reader is referred to the FIG. 1 depiction of a representative paging or messaging system (100), preferably, a selective one-way messaging system, but alternatively a two-way messaging system, communicating with an antenna (139) and thus a selective messaging unit (135). The messaging system (100) includes a gateway or terminal (103), coupled to a source such as the public switched telephone network (PSTN) (101). The terminal (103) is available from Motorola as the WMG™ product as well as from other manufacturers. The terminal is coupled to, often collocated with, a system controller or controller (105), such as a Motorola RF CONDUCTOR™. The terminal (103) and system controller (105), coupled together by switch port (102) operate together to communicate messages with destination addresses for the messaging unit (135) from the terminal (103) to the system controller (105) or various responses, in the case of a two-way system, back to the terminal (103), thus to the PSTN (101) and the originator.

The messaging system (100) includes, coupled to the controller (105), via a transmitter port (106), by the outbound network channel (107), a plurality of transmitters with five depicted as a first through 5th transmitter (111 . . . 115). The transmitters are available, for example, as Motorola NUCLEUS II™ transmitters or from other suppliers. The outbound network channel (107) is preferably leased telephone lines but may be any suitable media operating with any suitable networking or communication protocol including a radio or satellite link. It is understood that the FIG. 1 system is exemplary only and that much other equipment not here shown nor here relevant may be required in a practical system.

Additionally, the messaging system (100), if or when a two way system, includes, coupled to the system controller (105), via a receiver port (110), by a network channel (109), a plurality of base receivers, such as four depicted base receivers (117 . . . 120). The network channel is preferably leased telephone lines or any other suitable network link with the bandwidth necessary for the traffic expected on the channel. Typically at least some of the base receivers will be deployed at geographic locations different from the transmitters and typically more receivers are deployed than transmitters.

Generally the messaging system is a scheduled system using a protocol such as the FLEX™ one-way or ReFLEX™ two-way protocols by Motorola where all messages outbound or inbound are transmitted within time slots or frames in a cycle or time frame on an outbound or inbound channel (123, 129) each normally a different radio frequency. Typically within a given system all transmitters operate on the same outbound frequency or channel and often in a simulcast (nearly identical launchtime) mode. Other system or subsystems will operate on different frequencies to avoid undesirable interference. The system controller (105) is responsible for maintaining the schedule, designating what channel(s) if need be and respective transmitter(s) or radio frequency(ies) and when within the overall schedule for each channel, a message for a messaging unit will be transmitted, notifying messaging units of the time slot where they will receive messages and, if two way units, during what inbound time slot they are expected to acknowledge receipt of the message and what inbound slots are available for volitionally originated messages, according to a slotted ALOHA contention algorithm. Although not specifically shown it is understood that each transmitter operates in accordance with a common system time reference such as a reference as determined by a Global Positioning System (GPS).

The outbound messages are forwarded to the transmitters for subsequent transmission to the selective messaging unit, such as the depicted selective messaging unit (SMU) (135) in accordance with the system protocol at a particular time on the forward or outbound radio channels (123). The one-way or two-way selective messaging unit (135) includes the capability to acquire or re-acquire an operating channel while minimizing battery usage as further disclosed below. Messages originating at the messaging unit (135), either volitionally as in a registration request or responsive to a received message, such as an acknowledgment, are coupled by the reverse or inbound radio channel (129) to one or more of the base receivers where they are forwarded or relayed to the system controller on the inbound or network channel (109). The system controller may use these inbound messages for scheduling decisions, such as repeats, may forward them to the terminal, if, for example, they are intended for a user destination, or may use them to perform various traffic analysis and system management or configuration functions.

The processor (131) is coupled to the various input output ports, specifically switch, transmitter, and receiver ports (102, 106, 110) and further coupled to a memory (133). The memory is a combination of disk based and RAM based storage suitable for storing all operating software, as well as database information required by the system controller (105). In the exemplary diagram of FIG. 1 the controller is shown as a single entity. However it is understood that the controller and the terminal (103), either or both, may be composed of distributed terminal or distributed controller functions or resources and may be either collocated or located at a plurality of physical locations. This situation would likely be encountered in a large paging system.

Figure 4:
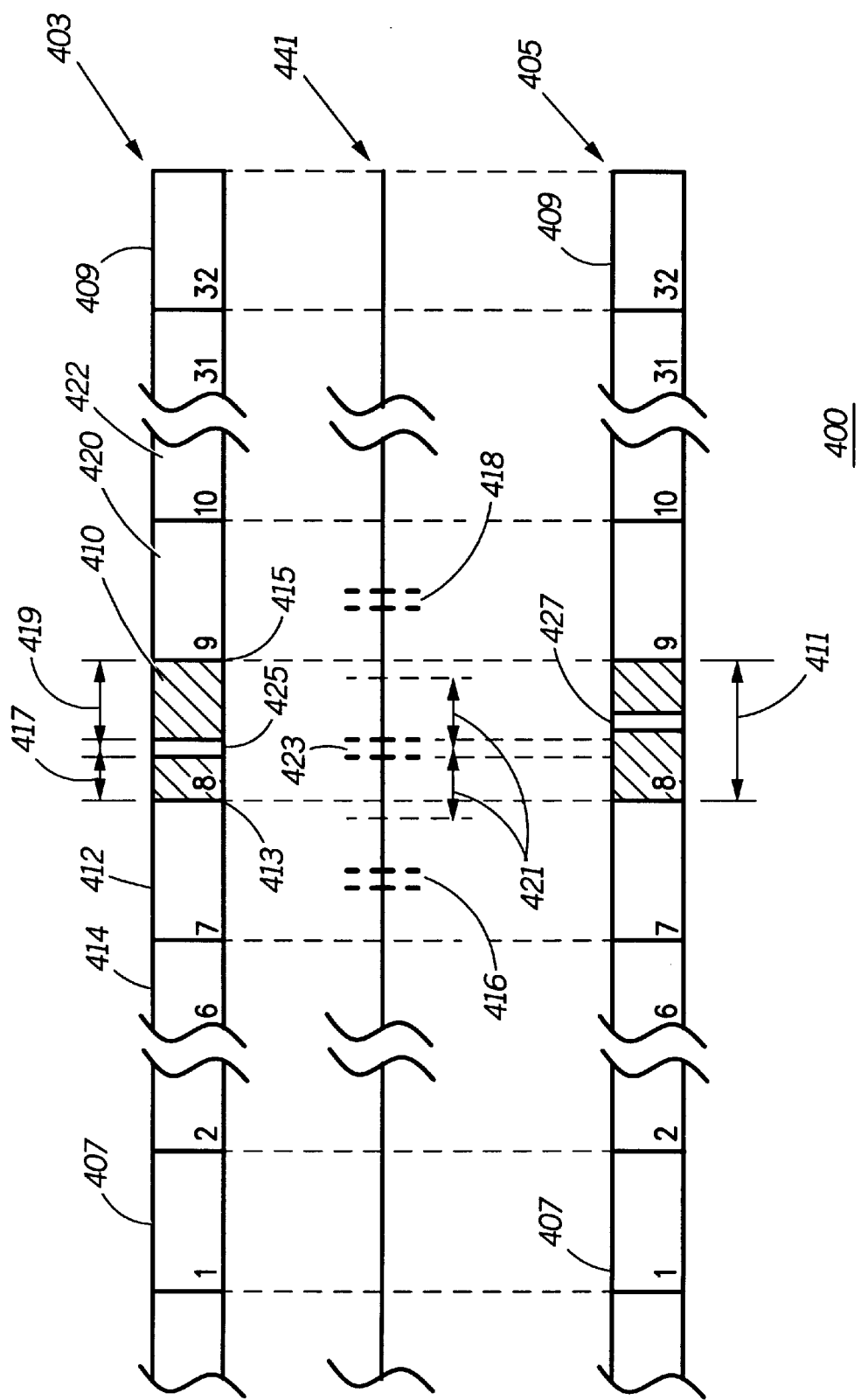
FIG. 4 is an exemplary protocol diagram.

Referring to the FIG. 4 representative channel protocol diagram, a brief explanation of the signal structure will be provided. The two, 32 frame, protocol slices depicted as (403, 405) preferably represent a time slice of each of two different operating channels with different operating frequencies. Protocol slice (403) preferably represents one operating channel (i.e.—channel one), such as channel (123) from transmitter (111), implementing a particular protocol preferably a FLEX™ family protocol. Protocol slice (405) preferably represents another operating channel (i.e. —channel two), such as the signal from transmitter (113). Channel two utilizes a protocol similar to or preferably an identically structured protocol as the protocol on channel one. This allows the selective messaging systems, utilizing known techniques, to schedule and transmit on either of the operating channels with a combination of protocols.

The 32 frames of the protocol slice (403) or protocol slice (405) each represent a frame lasting for a time slot or frame time (411), preferably, 1.875 seconds. The 32 frames depicted represent a one minute sub-cycle in a ReFLEX™ protocol and this sub-cycle repeats four times to provide a four minute long cycle including 128 frames. In each 32 frame sub-cycle of one or more operating channels (403, 405), the system controller (105) will schedule a synch in at least one of the frames, such as frame one (407), thus notifying selective messaging units of the frame number and allowing or providing for selective messaging units to remain locked to or in synch with the operating channel.

Between the frame 1 (407) and the 32ND frame (409) of the sub-cycle (403), there will exist a frame having a signal as shown in frame 8 (410). The controller (105) and the coupled plurality of transmitters (111 . . . 115) will transmit this frame or signal frame (410) that contains energy for the full frame time (411). Frame (410) is distinguished from other frames scheduled and transmitted by the selective messaging system by boundaries (413, 415). This facilitates the selective messaging unit (135) when doing energy scans and helps the unit to remain synchronous with the system. The additional reference numerals in FIG. 4 will be discussed below in connection with the operation of a selective messaging unit according to its time-line (441). The exact location of this frame will vary but be one of the first 8 frames if the channel carries roaming FLEX™ or one-way roaming traffic and will be located in one of the next 8 frames if the channel carries ReFLEX™ or two-way traffic. Here the protocol slices (403, 405) are both depicted with having this frame in the 8TH frame slot. In practice operating channels for physically proximate transmitters will change the location of this signal frame to further facilitate energy scans across many channels by the selective messaging unit.

Figure 2:
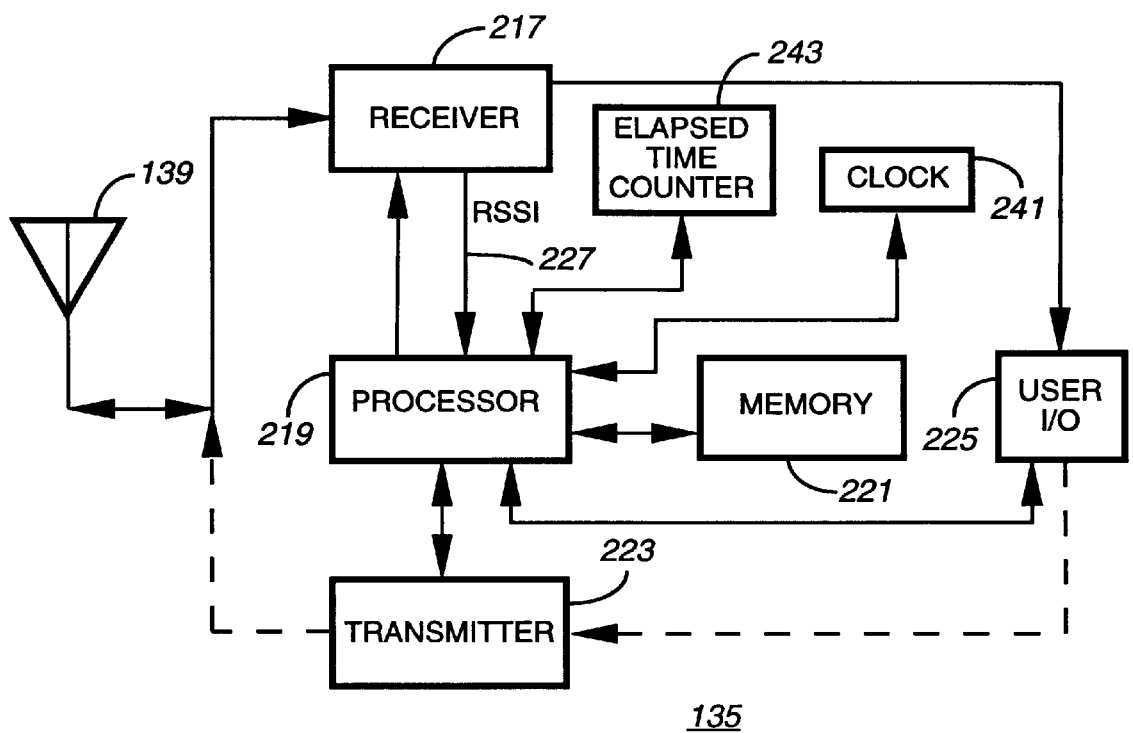
FIG. 2 is a more detailed block diagram of a preferred embodiment of a selective messaging unit suitable for use in the FIG. 1 selective messaging system and in accordance with the instant invention.

Continuing the present disclosure the reader is referred to the FIG. 2 block diagram of a selective messaging unit, such as unit (135) shown in FIG. 1 for the following discussion. Such selective messaging units are available from Motorola and other suppliers and are commonly referred to as pagers.

The readily available pagers would need to be modified in accordance with the principles disclosed herein and this modification would normally be a change in operating system and parameters readily implemented by one skilled in the art in view of the principles herein. FIG. 2 depicts a selective messaging unit arranged and constructed for acquiring or re-acquiring an operating channel while minimizing battery usage. The unit includes an antenna (139), coupled to a receiver (217) and an optional transmitter (223) for two way selective messaging units. The antenna (139) operates to absorb radio signals and couple them to the receiver (217) or alternatively to radiate radio signals coupled to the antenna from the optional transmitter (223). The reader will appreciate that the transmitter is available or part of the selective messaging unit only when the unit is a two-way messaging unit. The user I/O (225) is coupled to the receiver and the transmitter, when present, and represents the interface, such as displays and pushbuttons, by which the selective messaging unit and the user interact to, for example, control display and storage of messages received and, in the case of a two-way messaging unit, user driven responses.

The receiver includes generally known elements such as filters, amplifiers, detectors, mixers, frequency generation units or synthesizers, demodulators, decoders, and the like and is coupled to and under the control of a processor (219). The processor programs the synthesizer thus tuning the receiver (analogously transmitter if available) to and allowing it to operate, monitor, or scan one or more operating channels and receive various messages on those channels once acquired. Once a message is decoded or partly decoded the receiver together with the processor can check the address of that message with the address of the selective messaging unit. If there is a match, the message is intended for or addressed to this selective messaging unit. This channel is monitored as the operating channel until it is lost. The loss of the channel or operating channel can be determined by an inability of the receiver to decode data on the channel or by a detector within the receiver (217) that determines a Received Signal Strength Indication (RSSI) (227) of the signal on the channel being monitored. The processor (219) that is coupled to the receiver (217) determines whether the RSSI (227) is sufficient to reliably receive the operating channel. In any event, upon channel loss, the processor (219) will enable an elapsed time counter (243) to begin recording the elapsed time since such loss. The selective messaging unit is arranged to acquire, with minimal battery usage, an operating channel after that operating channel has been lost. To facilitate the acquiring or re-acquiring the operating channel, the selective messaging unit includes a clock (241) with a clock accuracy (421) that is coupled to the processor (219). This clock is preferably quartz crystal based and provides an oscillator stability of 10 parts-per-million (PPM) to 20 PPM drift over time, temperature, etc. The processor will provide for or determine this clock accuracy (421) that is determined or based on the time since that operating channel was lost or elapsed time and the oscillator stability. For example, given a ±10 PPM oscillator, a parameter stored in memory (221), and a 2 hour or 43,200 second elapsed time, the clock accuracy is 43,200*10/1,000,000=432 milliseconds. This is approximately ¼ of the frame time of 1.875 seconds in the preferred protocol. This clock accuracy (421) is compared to a first threshold (417), preferably corresponding to or equivalent to the temporal distance or time delta (417) to the nearest frame boundary (413) from a location (425) within the frame (410) where scanning, scan time, (423) will occur if the clock was perfectly accurate. The frame (410) is the periodic frame where a signal will be present if the operating channel is available. Regardless of the comparison, the receiver (217), coupled to the processor, will be activated to scan or search for the signal at the designated scan location (425) and scan time (423), based on the clock of the selective messaging unit, within the frame time. Responsive to the comparison of the clock accuracy (421) to a first threshold (417), the receiver scans at an adjacent scan time (416) for the signal during adjacent frames (412) based on the clock.

The apparatus and method further described below enables the selective messaging unit to re-synch or acquire the previously lost operating channel or one or more other channels subsequent to the operating channel loss. Once the comparison of the clock accuracy to the first threshold indicates the first threshold has been exceeded, the processor compares the clock accuracy (421) to a second threshold (419) or second time delta (419) corresponding to another frame boundary (415) of the frame (410). The receiver will be instructed by the processor to scan at a scan location (418) in search of energy when the clock accuracy exceeds the second threshold second time delta. When this comparison indicates the second threshold is exceeded, the processor compares the clock accuracy to an increasing integer multiple of the frame time and the first time delta, as well as, when appropriate, an increasing integer multiple of the frame time and the second time delta. As these progressive comparisons are made and thresholds exceeded by the clock accuracy, the processor continues to control the scanning of the receiver to progressively scan at designated scan times (416, 418) for the signal in one or more adjacent frames (412, 420) or higher order adjacent frames (414, 422) based on the clock. As the search for the operating channel continues, the search is made more efficient by the processor efficiently controlling the number and frequency of scans done by the receiver. Once the location of a signal of one or more appropriate operating channels is located, the processor or selective messaging unit utilizes known techniques to efficiently lock to the channel. This allows the selective messaging unit to extend the battery life of current selective messaging units. Since battery life is an issue for service providers and users, the acquisition of an operating channel while minimizing battery resource is considered advantageous by all. It is further understood that the time required to scan is significantly less than implied by (423, 425, 427, etc.), preferably set in a selective messaging unit. Additionally the designated scan locations (425, 427) are shown at different times. This allows the selective messaging unit to tune from one channel to another and do the energy scan. In practice the designated scan locations will be very close to the centers of the frame and the distance to either frame will be really identical thus making the aforementioned first and second thresholds equal.

Figure 3:
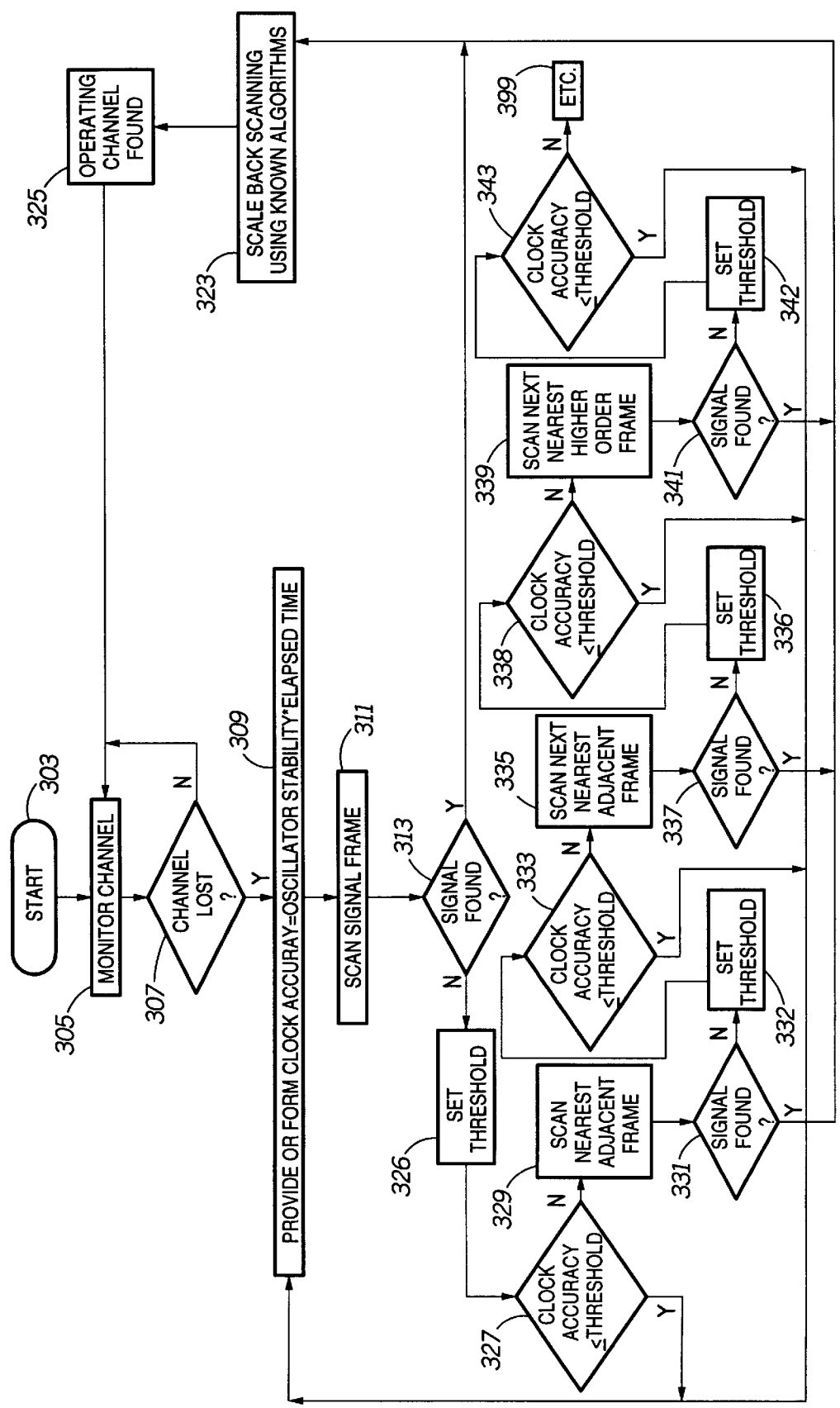
FIG. 3 is a flow chart of a preferred method embodiment in accordance with the present invention.

Continuing the present disclosure, the reader is referred to the FIG. 3 flowchart depicting a process or method for acquiring an operating channel while minimizing battery usage. The method begins or starts at (303) after which step (305) monitors one or more operating channels. Step (307) determines whether that operating channel has been lost. When that operating channel has not been lost, the method returns to step (305) to monitoring one or more operating channels. Once that operating channel has been lost, step (309) provides a clock accuracy which is the oscillator stability multiplied by the elapsed time. This clock accuracy is, preferably, determined by the processor (219) based on the time elapsed since that channel was lost and the oscillator stability stored in the memory (221). The oscillator stability, preferably expressed in partsper-million (PPM), is a known value that together with the elapsed time can be used to describe the accuracy of the clock (241). In step (311) the method scans the signal frame (410) looking for a signal or energy at a particular scan location within the frame boundaries. The method then tests whether a signal was found in step (313). If a signal is found, energy is detected, the method will proceed to step (323) where the scanning is scaled back using known algorithms thereby preserving valuable battery resources. The operating channel is found or locked to in step (325) prior to returning to step (305). If a signal is not found in step (313), step (326) sets the first threshold to a first time delta corresponding to the nearest frame boundary prior to comparing the clock accuracy to this first threshold in step (327). When the clock accuracy is less than or equal to the first threshold or the first time delta corresponding to the nearest frame boundary, the method returns to step (309) to re-do or provide a clock accuracy. When the clock accuracy exceeds the first threshold, the method scans the nearest adjacent frame in step (329). The method tests whether a signal was found in step (331). If a signal is found, the method continues on to step (323). When the signal is not found in step (331), step (332) sets the second threshold to a second time delta corresponding to another frame boundary. Step (333) compares the clock accuracy to the second threshold. When the clock accuracy is less than the second threshold, the method returns to step (309). When the second threshold exceeds the clock accuracy, the method proceeds to step (335) and scans the next nearest adjacent frame for the signal. Step (337) verifies whether a is signal is found in the scan at step (335). If a signal is found, the method continues on to step (323). If no signal is found in step (337), the method goes to step (336) and sets the threshold to the first time delta plus an integer multiple, preferably one (1), of the signal frame time. Step (338) tests whether the clock accuracy is less than or equal to this threshold. If the test of step (338) yields a positive result, the method returns to step (309) and updates or provides a clock accuracy. If the test of step (338) yields a negative result, the method continues on to step (339) and scans the next higher order adjacent frame prior to determining whether a signal is found in step (341). If a signal is found in step (341), the method returns to step (323). If no signal is found in step (341), the method sets the threshold to the second time delta plus an integer multiple of the signal frame time. Step (343) tests whether the clock accuracy is less than or equal to the threshold. If the test of step (343) yields a positive result, the method once again returns to step (309). When the clock accuracy is not less than or equal to the threshold, the method continues on to successive thresholds and subsequent tests based on the aforementioned established pattern as depicted in step (399).

The above discussed apparatus and methods may be further modified or utilized to cover various other uses for the disclosed principles. For example, when the clock accuracy approaches one half of a frame the scan may be offset a half-frame and a second scan inserted, thus insuring the signal frame will be detected and only one additional scan is added.

As another example these principles may be used when the signal frame or full frame is one of a known set of frames. This is useful in looking for a neighboring channel that has a different signal frame but the messaging unit knows that the signal frame for the neighboring system is one of the frame 8 through frame 15 set. By keeping track of elapsed time since an operating channel and hence system time was known the unit can determine when to add an additional scan to either side of the attempt to scan frame 8 through frame 15.

It is understood that the principles discussed may be applied to any situation where a signal is known to be available for a predetermined time period. For example for protocols where a SYNC is known to be available for a short portion of a frame the scans are centered on this SYNC and the elapsed time since the system time was known is kept track of. Additional scans or offset scans may be added.

It will be appreciated by those of ordinary skill in the art that the apparatus and methods disclosed minimize acquisition latency of an operating channel, once lost, while minimizing battery usage. The inventive techniques control or minimize the number and frequency of scans done by a receiver to obtain an operating channel after the channel has been lost. These inventive structures and methods may be readily and advantageously employed in selective messaging units, or other communications devices or systems to extend limited energy resources.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. In a selective messaging unit having a clock and operable on one or more operating channels, each operating channel temporally divided into frames with a frame having a signal lasting for a frame time, the frame periodically repeating, a method of acquiring an operating channel after that operating channel has been lost, the method minimizing battery usage and including the steps of:

recording an elapsed time since losing the operating channel;

calculating a clock accuracy value equal to a product of an oscillator stability and the elapsed time;

comparing said clock accuracy value to a first threshold determined from a temporal distance between a nearest frame boundary and a location within the frame where scanning will occur when the clock is perfectly accurate;

scanning for the signal during a time of the frame as determined by said clock; and also scanning for the signal during the time of an adjacent frame as determined by said clock, when the clock accuracy value is not less than the first threshold.

2. The method of claim 1, wherein said step of comparing further includes a step of comparing said clock accuracy value to a first time delta corresponding to a nearest frame boundary of said frame.

3. The method of claim 2 wherein said step of comparing further includes comparing said clock accuracy value to a second threshold.

4. The method of claim 3 wherein said step of comparing further includes a step of comparing said clock accuracy value to a second time delta corresponding to another frame boundary of said frame.

5. The method of claim 4 wherein said step of comparing said clock accuracy value further includes comparing said clock accuracy value to said second time delta plus an integer multiple of signal frame time.

6. The method of claim 3 wherein said step of comparing said clock accuracy value further includes comparing said clock accuracy value to said first time delta plus an integer multiple of signal frame time.

7. A selective messaging unit operable on one or more operating channels, each operating channel temporally divided into frames with a frame having a signal lasting for a frame time, the frame periodically repeating, the selective messaging unit arranged to acquire, with minimal battery usage, an operating channel after that operating channel bas been lost, the selective messaging unit comprising in combination:

a clock having a known oscillator stability;

a processor, coupled to said clock and coupled to a receiver, wherein the processor is programmed to:

record an elapsed time since losing the operating channel;

calculate a clock accuracy value equal to a product of the known oscillator stability and the elapsed time; and compare said clock accuracy value to a first threshold determined from a temporal distance between a nearest frame boundary and a location within the frame where scanning will occur when the clock is perfectly accurate; and the receiver, coupled to said processor, for scanning for the signal during a time of the frame as determined by said clock; and also scanning for the signal during the time of an adjacent frame as determined by said clock, when the clock accuracy value is not less than the first threshold.

8. The selective messaging unit of claim 7 wherein said processor compares said clock accuracy value to a first time delta corresponding to a nearest frame boundary of said frame.

9. The selective messaging unit of claim 8 wherein said processor compares said clock accuracy value to a second threshold.

10. The selective messaging unit of claim 9 wherein said processor further compares said clock accuracy value to a second time delta corresponding to another frame boundary of said frame.

11. The selective messaging unit of claim 10 wherein said processor wherein compares said clock accuracy value to said second time delta plus an integer multiple of signal frame time.

12. The selective messaging unit of claim 9 wherein said processor wherein compares said clock accuracy value to said first time delta plus an integer multiple of signal frame time.

\* \* \* \* \*